July 9, 1968     E. HÉJJ     3,391,677

ROTARY PISTON ENGINE

Filed Nov. 29, 1962

Inventor:
Erwin Héjj

United States Patent Office 3,391,677
Patented July 9, 1968

1

3,391,677
ROTARY PISTON ENGINE
Erwin Héjj, Essen-Borbeck, Germany, assignor to
Beteiligungs- und Patentverwaltungsgesellschaft mit
beschränkter Haftung, Essen, Germany
Filed Nov. 29, 1962, Ser. No. 240,939
Claims priority, application Germany, Dec. 9, 1961,
B 65,124
12 Claims. (Cl. 123—8)

The present invention relates to a rotary piston engine with epitrochoidal housing and a rotor rotating therein. With heretofore known rotary piston engines, due to the different structural arrangements over customary reciprocating piston engines, the compression chamber is, by far, not so compact as is the case with reciprocating piston engines. Therefore, with rotary piston engines, a proper formation of the mixture, as it is indispensable, for instance, for the fuel and air mixture of diesel engines, causes considerable difficulties.

It is, therefore, an object of the present invention to provide a rotary piston engine which will overcome the above mentioned difficulties.

It is another object of this invention to provide a rotary piston engine which will assure the formation of a satisfactory fuel air mixture and thereby an efficient operation of the engine.

These and other objects and advantages of the invention will appear more clearly from the following specification in connection with the accompanying drawing, in which.

General arrangement

In order to realize the objects outlined above, according to the present invention, in the housing body, preferably near the minimum radius portions intermediate the group of lobes of the epitrochoid, there is provided at least one chamber which communicates with the interior of the housing through at least two bores arranged one behind the other when looking in the direction of rotation of the rotor. If the machine is operated by fuel injection, it is expedient to have at least one injection nozzle leading into such chamber.

The air or gas flow which, due to the movement of the rotor, passes along the inner wall of the housing, will then, at least partially, be passed through said chamber. The location of the bores and of the injection nozzle may be so selected that a good mixture formation will be assured. In particular, in order to obtain a directed flow in the chamber, it is suggested to have the bores lead into the chamber approximately tangentially with regard to the inner wall of the chamber. The constriction of the cross section of the air flow at the minimum radius portions of the epitrochoid may be taken advantage of if, according to a further development of the invention, said bores are arranged on both sides of said minimum radius portions.

Furthermore, it is advantageous instead of providing individual bores, to arrange a plurality of bores in different planes, preferably in planes perpendicular to the axis of rotation of the rotor. Said bores should extend from the chamber to the inner wall of the housing in such a way that there will be provided communications between the chamber and the interior of the housing over the entire width of the rotor.

In order to pass as much as possible of the entire air flow through the chamber, according to a further development of the invention, a radially adjustable strip is provided in the housing wall between the above mentioned

2 bores, which strip will reduce the gap between the housing and the rotor. For manufacturing reasons, such gap cannot be reduced below a certain magnitude.

Finally, it is particularly advantageous to arrange an ignition or glow plug and/or decompression valve in the chamber.

Structural arrangement

Figure 1:
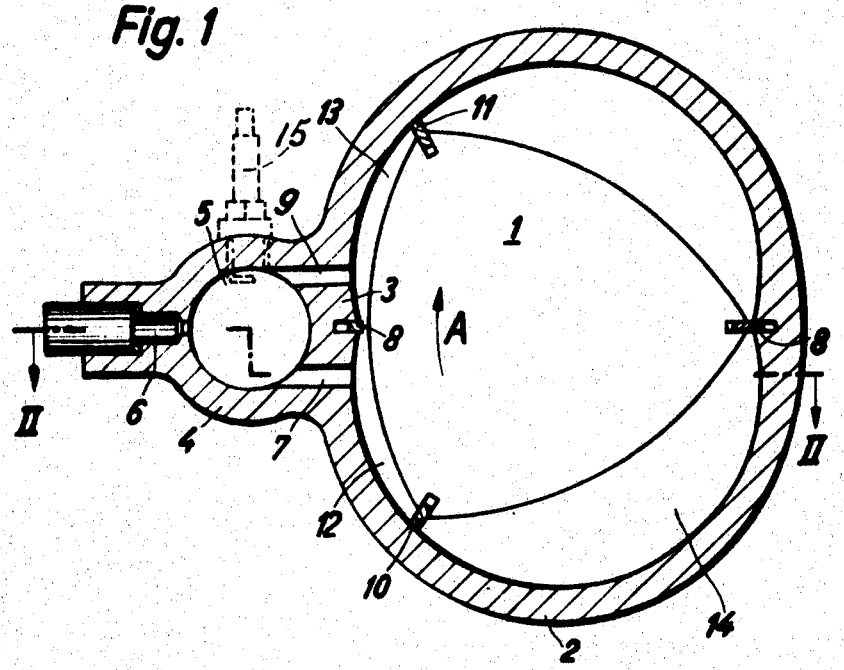
FIG. 1 illustrates a cross section through a portion of a rotary piston engine according to the present invention.

Referring now to the drawings in detail, the arrangement shown in FIG. 1 comprises a rotor 1 of a rotary piston engine which rotor is rotatably arranged in customary manner in a housing 2 having an epitrochoidal inner wall. In the neighborhood of the minimum radius portion 3 of the epitrochoid, there is provided a chamber 5 which may also be called an "antechamber" and which is located in the housing body 4. An injection nozzle 6 leads into the chamber 5 which latter through bores 7, 9 communicates with the interior of the housing 2. These bores 7, 9 are arranged on both sides of the minimum radius portion 3, as is clearly shown in FIG. 1.

Figure 2:
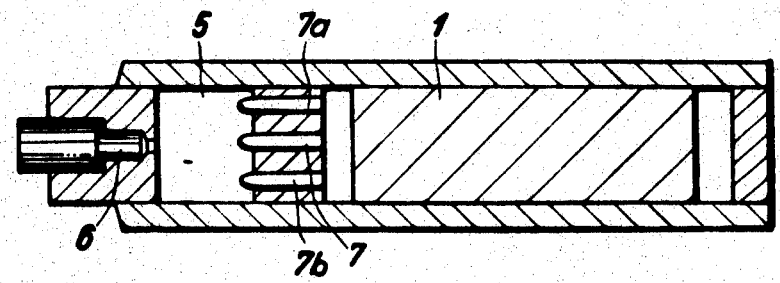
FIG. 2 represents a section taken along the line II—II of FIG. 1.

As will be evident from FIG. 2, a plurality of bores 7, 7a, 7b lead from chamber 5 into the interior of the housing 2 and are located alongside each other. A similar arrangement (not shown in the drawings) may be selected with regard to the bores 9. At the minimum radius portion 3 there is provided a radially adjustable sealing strip 8 which is located in a recess in the housing wall. This recess opens toward the interior of the housing. As will be evident from the drawing, the said sealing strip 8 is adapted to decrease the gap between the housing and the rotor which gap, as mentioned above, is necessary for manufacturing reasons, but while being desired as small as possible can mechanically during the machining operation not be reduced below a certain magnitude.

During the rotary movement of rotor 1 in the direction of the arrow A, the content of chamber 12 is pressed through bores 7, 7a, 7b into the chamber 5 and in the latter is subjected to turbulence and intermixed with injected fuel whereupon the thus obtained fuel air mixture will be passed through bores 9 into chamber 13.

When, following the combustion of the fuel air mixture during the further movement of rotor 1, the sealing strip 10 passes along the housing inner wall between the bores 7 and 9, a partial expansion of the fuel gases will occur. This is due to the fact that some gases will pass from the chamber 5 into chamber 14. However, since during this time period the pressure drop between the chambers 12, 13 on one hand and the chamber 14 on the other hand is only minor, only a very small quantity of exhaust gas enters the chamber 14. This small quantity of exhaust gas does not materially affect the condition of the air. On the other hand, the charging of chamber 14 which is effected at the same time will be advantageous.

It is, of course, to be understood that the present invention is, by no means, limited to the particular construction shown in the drawings but also comprises any modifications within the scope of the appended claims.

Thus, while alloy cast iron has been found particularly suitable for the sealing strip 8, also other suitable sealing material may be employed.

Furthermore, in addition to the injection nozzle 6 there may also be provided ignition means 15 (indicated in dot-dash lines in FIG. 1) in the form of an ignition plug or a glow plug.

What I claim is:

1. A rotary piston engine which comprises: a housing having an inner epitrochoidal surface disposed about a first axis, a rotor arranged about a second axis and supported for relative turning movement within said housing such that said rotor turns about said second axis as said second axis rotates about said first axis, said rotor having an outer surface for cooperation with said epitrochoidal surface so as to confine therewith chambers alternately increasing and decreasing with the rotation of said rotor in one and the same direction, said housing having at least one antechamber spaced from the interior of said housing, and a plurality of conduit means arranged one behind the other when looking in the direction of rotation of said rotor, said conduit means establishing communication between said antechamber and at least one of said alternately increasing and decreasing chambers.

2. A rotary piston engine which comprises: a housing having an inner epitrochoidal surface with inwardly directed ridges, a rotor supported for relative turning movement within said housing and having an outer surface for cooperation with said epitrochoidal surface so as to confine therewith chambers alternately increasing and decreasing with the rotation of said rotor in one and the same direction, said housing having at least one antechamber spaced from the interior of said housing and located near one of said ridges, and a plurality of conduit means arranged one behind the other when looking in the direction of rotation of said rotor, said conduit means establishing communication between said antechamber and at least one of said alternately increasing and decreasing chambers.

3. A rotary piston engine according to claim 1, in which said conduit means are arranged on opposite sides of said one ridge.

4. A rotary piston engine according to claim 1, which includes at least one injection nozzle extending into said antechamber.

5. A rotary piston engine which comprises: a housing having an inner epitrochoidal surface with inwardly directed ridges, a rotor supported for relative turning movement within said housing and having an outer surface for cooperation with said epitrochoidal surface so as to confine therewith chambers alternately increasing and decreasing with the rotation of said rotor in one and the same direction, said housing having at least one antechamber spaced from the interior of said housing, and a plurality of conduit means arranged one behind the other when looking in the direction of said rotor, said conduit means establishing communication between said antechamber and at least one of said alternately increasing and decreasing chambers and leading into said antechamber approximately tangentially with regard to the inner wall thereof.

6. A rotary piston engine which comprises: a housing having an inner epitrochoidal surface, a rotor supported for relative turning movement within said housing and having an outer surface so as to confine therewith chambers alternately increasing and decreasing with the rotation of said rotor in one and the same direction, said housing having at least one antechamber spaced from the interior of said housing, and a plurality of groups of conduit means arranged one behind the other when looking in the direction of rotation of said rotor, said groups respectively being located in different planes while the conduit means of each of said groups are located in substantially the same plane and distributed over substantially the entire width of said rotor, said conduit means establishing communication between said antechamber and at least one of said alternately increasing and decreasing chambers.

7. A rotary piston engine according to claim 6, in which each group of conduit means is respectively located in a plane perpendicular to the plane of rotation of said rotor and parallel to the axis of rotation of said rotor.

8. A rotary piston engine according to claim 1, which includes adjustable strip means adjustably located in said housing between the points where said conduit means lead into the interior of said housing.

9. A rotary piston engine which comprises: a housing having an inner epitrochoidal surface with inwardly directed ridges, a rotor supported for relative turning movement within said housing and having an outer surface for cooperation with said epitrochoidal surface so as to confine therewith chambers alternately increasing and decreasing with the rotation of said rotor in one and the same direction, said housing having at least one antechamber spaced from the interior of said housing and located near one of said ridges, strip means adjustably located at said ridge means for adjustment in the direction toward said rotor, and a plurality of conduit means arranged one behind the other when looking in the direction of rotation of said rotor, said conduit means establishing communication between said antechamber and at least one of said alternately increasing and decreasing chambers.

10. A rotary piston engine according to claim 1, which includes ignition means extending into said antechamber.

11. A rotary piston engine according to claim 1, which includes decompression valve means communicating with the interior of said antechamber.

12. A rotary internal combustion engine having a cycle including the four strokes of intake, compression, expansion and exhaust and comprising an outer hollow body and an inner body supported for relative turning movement within the outer body, and turning on an axis eccentric of and parallel to the axis of the outer body, said bodies having respective facing surfaces defining a plurality of variable volume working chambers, said facing surfaces comprising the outer surface of the inner body and the inner surface of the outer body which includes a plurality of arched lobe-defining portions spaced circumferentially on the axis of the outer body, said outer surface of the inner body including a plurality of apex portions spaced circumferentially about the axis of the inner body, said apex portions including seals which extend parallel to the axis of the inner body and engage the inner surface of the outer body, intake passage means arranged to communicate with the space between the exterior of the inner body and interior of the outer body for successively feeding all said chambers as the bodies relatively move, exhaust passage means also arranged to communicate with said space, means forming a precombustion chamber, a nozzle connected to said means for injecting fuel into said precombustion chamber, and means in said precombustion chamber for igniting the fuel, said outer body including passage means adjacent a lobe junction for connecting the precombustion chamber with each of the working chambers after intake and before exhaust while working chamber volume is relatively small, the passage means being disposed laterally of a location along the inner surface of the outer body where pressure on both sides of an apex seal is the same and including separate passages spaced apart at the inner surface of the outer body in the direction of motion of the inner body for connecting adjacent working chambers through the precombustion chamber when an apex seal is between the spaced passages.

References Cited

UNITED STATES PATENTS 3,053,238   9/1962   Meurer _____ 123—8

RALPH D. BLAKESLEE, *Primary Examiner.*

JOSEPH H. BRANSON, JR., *Examiner.*

F. T. SADLER, *Assistant Examiner.*